Patented Dec. 28, 1943

2,337,645

UNITED STATES PATENT OFFICE 2,337,645

MEAT TREATMENT

Leon L. Cadwell, Chicago, Ill., assignor to Industrial Patents Corporation, Chicago, Ill., a corporation of Delaware No Drawing. Application March 24, 1941,
Serial No. 384,958

6 Claims. (Cl. 99—169)

This invention relates to a process of treating food products for frozen storage and more particularly it relates to a method of pretreating hams before coating for frozen storage.

Over a period of many years there have been many suggestions for coating food products, such as meat, for frozen storage in order to prevent desiccation and contamination of the meat during this period. These film coverings have not been used extensively in the preservation of meat during frozen storage because they either are oily, tacky or brittle, or are so expensive they cannot be employed unless they are reclaimed. Oily and tacky products are difficult to remove from the food. Brittle products are unsatisfactory because they chip from the surface and allow desiccation by barometric pumping at the exposed areas. Furthermore, with any film preparation that is removed from stored food products for reclaiming there is the great problem of contamination of the recovered coating with a part of the food. When the coating is re-used it is then substantially altered in composition and consequently in properties. For example, wax coatings recovered from coated frozen hams have a general tendency to become increasingly tacky due to the softening effect of fatty material stripped from the ham. The coating then gradually becomes more difficult to remove and reclaim conveniently.

It has now been found possible to coat food products for frozen storage so that there is no substantial contact between the coating and the food product, and hence no cross-contamination of any type. It has also been found possible to coat the food products for frozen storage so that the coating may be readily removed and recovered without modification thereof. By this novel process it is now possible to recover the product in an intact form without any substantial shrinking.

The present invention in general comprises applying an aqueous glaze on the food product, after which it is covered with an impervious coating that resists desiccation of the product during frozen storage and that excludes air, brine or other materials which might adversely effect the product.

The aqueous glaze, usually an ice coat, may be produced on the ham or other food product by a number of different methods. For example, it is possible to freeze the non-coated food product substantially completely and then to coat it with a suitable glaze by dipping, wiping or spraying with water or an aqueous solution. The glazed ham may then be coated with a suitable resistant, impervious coating. Another variation is to partially freeze the uncoated product and then to coat the partially frozen product with a suitable aqueous glaze. The glazed ham may then be covered with an impervious coating, such as is described in the Koonz and Ingle copending application, Serial No. 384,952, filed March 24, 1941. The glazed, partially frozen product with or without the wax coating is then frozen completely by any suitable method, such as moving, cold air. This coating of the partially frozen product possesses particular merit because the product has sufficient rigidity to permit handling without breaking of the ice coating but is not dehydrated to the extent a totally frozen product might be. Because an uncoated product must necessarily be frozen in still air in order to avoid substantial dehydration, the time for freezing by this method is usually excessively great. However, by first partially freezing the product in this relatively slow manner, then coating the product with the ice glaze followed by a resistant, impervious organic and/or inorganic layer, such as wax, resin or rubber, it is possible to finish the freezing by more efficient and rapid methods, such as immersion in cold brine or by blowing cold air with fans.

The water used for preparing the glaze is preferably boiled or distilled in order to remove dissolved air or other gases which would separate as bubbles in the glaze during freezing. This treatment of the water also sterilizes it, which is advantageous in many cases for particular food products.

Although water alone is preferably used in preparing the glaze, it is also possible to use aqueous solutions or dispersions containing honey, sugar, molasses, gelatin, pectin, salt, casein, citric acid, bentonite, and/or the like. One or more glaze coats of the same or different compositions may be used in pre-coating the food products.

The outer coating may be any of a great variety of resistant organic and/or inorganic materials, such as hydrocarbon waxes, ester waxes, natural resins, synthetic resins, natural rubber, rubber derivatives, synthetic rubber, fatty substances, casein, gelatin, clay or mixtures of these materials with or without other materials such as plasticizers, oils, glycerol, aromatic substances, flavors, essential oils, germicides, wetting agents and/or the like. The preferred coatings for this purpose have the following general composition: Pliolite (rubber resin) 7% to 15%, amorphous petroleum wax (M. P. ca. 140° F.) 70% to 90%, and amorphous petroleum wax (M. P. ca. 160° F.) 0% to 20%. It is possible to apply any of the foregoing coatings in a molten condition, a solution in the solvent, or dispersed in a non-solvent such as water.

One or more of the resistant solid organic and/or inorganic outer coats of the same or different compositions may be applied. For example, the glazed food may be coated with a soft, pliable wax which will withstand stretching at low temperatures, e. g., —10° F., followed by a harder, firmer wax or synthetic resin coating such as polyvinyl acetate or the like.

Among the merits of the present method of operating are: Desiccation is minimized during the freezing treatment; the coatings may be recovered without contamination by the ham or other food product; greater latitude in the constitution of the coating is permitted since it does not come in contact with the surface of the food product; there is no tendency for the coating to adhere to the product so as to cause pieces of the product to be removed with the coating; tacky and oily coatings may be used since they can be readily separated from the product due to the ice glaze interlayer; brittle coatings may be used since there is less tendency to crack with consequent oxidation and dehydration normally associated therewith; and quick freezing methods such as immersion in low temperature brines or moving air may be employed.

The following examples of methods of operating are given for the purpose of illustrating the present invention, but they are not intended to be limiting on the scope thereof.

Example I

The uncovered green or cured hams with the customary string on the shank end are placed on hooks or rods in a still air freezer at a temperature of about 0° to —5° F. The product is permitted to remain in the freezer until about ¼ of an inch of the outer part of the ham is frozen hard. The ham is then glazed by moving a dip pot containing cold water up around the ham so as to completely submerge the ham without removing it from the hanging position. The dip pot is lowered and the ham is permitted to hang for about five minutes at the low temperature, thereby forming a hard ice glaze uniformly over the surface. At the end of this time a dip pot with a molten composition containing about 11% Pliolite, 71% 140° F. amorphous petroleum wax and 18% 160° F. amorphous petroleum wax at a temperature of about 160° F. to 200° F. is raised around the ham to cover the entire surface thereof. The dip pot is then lowered and the ham is allowed to remain without moving until the freezing has been finished, for example about three to four days. After the coating, the freezing of the hams may be expedited by employing fans for circulating the cold air or by immersing in a cold brine. When employing the cold brine there is a rapid turnover of freezing space and quick freezing producing smaller ice crystals is obtained. The hams are then usually removed from the hanging position and piled in storage bins until they are needed for use.

Example II

The green ham is hung in a still air freezer at a temperature of about 0° to —5° F., where it is permitted to remain until it is completely frozen. It is then dipped or sprayed with cold water so as to completely coat the surface with an ice glaze. It is then coated with a molten wax composition by dipping or spraying. After a few minutes of further hanging in the freezer at the low temperature so that the wax coat will set, the hams are removed and stored in freezer storage bins or immersed in cold brine for storage. Because of the impervious, water-insoluble coating on the exterior of the hams, there is no contamination or deterioration of the hams by the surrounding air or brine.

Obviously many modifications and variations of the invention hereinbefore set forth may be made without departing from the spirit and scope thereof, and therefore, only such limitations should be imposed as are indicated in the appended claims.

I claim:
1. In the process of preparing meat products for freezer storage, the steps of forming an ice glaze on the surface of the product and then covering the glazed product with a resistant, impervious wax coating.

2. The process of treating meat products for freezer storage which comprises forming an aqueous glaze on the surface of the product, coating the glazed product with a wax coating containing petroleum wax and rubber resin organic substance, and storing the product at freezing temperatures for a substantial period of time.

3. In the process of freezing hams, the step of freezing an aqueous glaze on the ham surface, and then covering the glazed ham with a resistant impervious wax-rubber coating.

4. The process of treating hams for freezer storage which comprises freezing an aqueous glaze on the ham surface, coating the glazed ham with a wax coating containing petroleum wax and rubber resin, and storing the product at freezing temperatures for a substantial period of time.

5. The process of treating hams for freezer storage which comprises freezing an ice glaze on the ham surface, coating the glazed ham with an amorphous petroleum wax-Pliolite mixture, and storing the ham at freezing temperatures for a substantial period of time.

6. The process of treating ham for freezer storage which comprises freezing an aqueous glaze on the ham surface, coating the glazed product with a composition comprising essentially 85–93% high melting amorphous petroleum wax and 7–15% Pliolite, and storing the product at freezing temperatures for a substantial period of time.

LEON L. CADWELL.

CERTIFICATE OF CORRECTION.

Patent No. 2,337,645.　　　　　　　　　　　　　　December 28, 1943.

LEON L. CADWELL.

It is hereby certified that error appears in the printed specification of the above numbered patent requiring correction as follows: Page 2, second column, lines 37 and 38, claim 2, strike out "containing petroleum wax and rubber resin organic substance" and insert instead the word --composition--; and that the said Letters Patent should be read with this correction therein that the same may conform to the record of the case in the Patent Office.

Signed and sealed this 29th day of February, A. D. 1944.

Leslie Frazer (Seal)　　　　　　　　　　　　　　　　　　Acting Commissioner of Patents.